(12) United States Patent
Acosta et al.

(10) Patent No.: US 8,356,068 B2
(45) Date of Patent: Jan. 15, 2013

(54) MULTIMEDIA TRAINING SYSTEM AND APPARATUS

(75) Inventors: Carlos A. Acosta, Round Rock, TX (US); Archie D. Barrett, Jr., Georgetown, TX (US); Brandon Merkord, Wimberley, TX (US); Erin Silver, Austin, TX (US); David I. Perl, Austin, TX (US); Jeffery A. Eastman, Austin, TX (US); Robin Donelson, Austin, TX (US)

(73) Assignee: Alchemy Systems, L.P., Austin, TX (US)

( * ) Notice: Subject to any disclaimer, the term of this patent is extended or adjusted under 35 U.S.C. 154(b) by 457 days.

(21) Appl. No.: 12/683,279

(22) Filed: Jan. 6, 2010

(65) Prior Publication Data

US 2011/0167103 A1 Jul. 7, 2011

(51) Int. Cl.
*G06F 15/16* (2006.01)
(52) U.S. Cl. ......... 709/203; 709/224; 709/204; 434/350
(58) Field of Classification Search .................. 709/203, 709/217–219, 248; 434/350
See application file for complete search history.

(56) References Cited

U.S. PATENT DOCUMENTS

| | | | |
|---|---|---|---|
| 4,764,120 A | 8/1988 | Griffin et al. | |
| 5,002,491 A | 3/1991 | Abrahamson et al. | |
| 5,093,786 A | 3/1992 | Derks | |
| 5,226,177 A | 7/1993 | Nickerson | |
| 5,273,437 A | 12/1993 | Caldwell et al. | |
| 5,361,200 A | 11/1994 | Weybright et al. | |
| 5,692,906 A | 12/1997 | Corder | |
| 5,724,357 A | 3/1998 | Derks | |
| 5,788,508 A | 8/1998 | Lee et al. | |
| 5,823,788 A | 10/1998 | Lemelson et al. | |
| 5,860,023 A * | 1/1999 | Tognazzini | 710/15 |
| 6,021,119 A | 2/2000 | Derks et al. | |
| 6,086,381 A | 7/2000 | Downs et al. | |

(Continued)

OTHER PUBLICATIONS http://en.wikipedia.org/wiki/Carrier_sense_multiple_access_with_collision_detection, Apr. 2012.

*Primary Examiner* — Philip B Tran
(74) *Attorney, Agent, or Firm* — Jack D. Stone, Jr.; Scheef & Stone, L.L.P.

(57) ABSTRACT

A method for providing interactive training, whereby a video display and a base station are coupled in communication with a computer. A plurality of wireless handheld remotes are configured for wirelessly communicating with the base station, and each of the remotes is operable by a respective trainee of a group of trainees. Each remote has a remote ID unique from all other remotes and is stored in non-volatile memory of the computer; and the base station includes a base station ID code unique from all other base stations, and the base station ID is stored in non-volatile memory of each remote. Each remote remains in an inactive state and is operable to be activated via a respective activate signal transmitted from the base station, and the base station is operable to transmit an activate signal to one or more of the remotes, the activate signal being effective for enabling the remote to transmit a signal, wherein the remote is deactivated upon completion of transmission of signal. Using unique IDs prevents interference from other wireless devices including remotes paired with other base stations. It also makes it unnecessary for one training system to operate on a different channel from another training system.

23 Claims, 8 Drawing Sheets

U.S. PATENT DOCUMENTS

| | | | |
|---|---|---|---|
| 6,157,808 A * | 12/2000 | Hollingsworth | 434/350 |
| 6,311,276 B1 | 10/2001 | Connery et al. | |
| 6,341,212 B1 * | 1/2002 | Shende et al. | 434/350 |
| 6,356,437 B1 | 3/2002 | Mitchell et al. | |
| 6,386,882 B1 | 5/2002 | Linberg | |
| 6,471,521 B1 | 10/2002 | Dornbush et al. | |
| 6,535,713 B1 | 3/2003 | Houlihan et al. | |
| 6,567,079 B1 | 5/2003 | Smailagic et al. | |
| 6,571,299 B1 | 5/2003 | Schroyer et al. | |
| 6,606,744 B1 | 8/2003 | Mikurak | |
| 6,895,213 B1 | 5/2005 | Ward | |
| 6,915,346 B1 | 7/2005 | Kato et al. | |
| 7,167,696 B2 | 1/2007 | Backes et al. | |
| 7,277,671 B2 | 10/2007 | Glass et al. | |
| RE39,942 E | 12/2007 | Fai et al. | |
| 7,330,716 B2 | 2/2008 | Adkins | |
| 7,330,875 B1 * | 2/2008 | Parasnis et al. | 709/204 |
| 7,343,134 B1 | 3/2008 | Ward | |
| 7,366,169 B1 | 4/2008 | Backes et al. | |
| 7,480,265 B2 | 1/2009 | Cromer et al. | |
| 8,130,273 B2 * | 3/2012 | Delia et al. | 348/169 |
| 2002/0031755 A1 | 3/2002 | Lo et al. | |
| 2002/0106622 A1 * | 8/2002 | Osborne et al. | 434/350 |
| 2002/0134844 A1 | 9/2002 | Morales | |
| 2003/0073064 A1 | 4/2003 | Riggs | |
| 2004/0014016 A1 | 1/2004 | Popeck et al. | |
| 2004/0015132 A1 | 1/2004 | Brown | |
| 2004/0191744 A1 | 9/2004 | Guirguis | |
| 2004/0224291 A1 | 11/2004 | Wood | |
| 2004/0229199 A1 * | 11/2004 | Ashley et al. | 434/323 |
| 2005/0003330 A1 | 1/2005 | Asgarinejad et al. | |
| 2005/0106540 A1 | 5/2005 | Wasowicz et al. | |
| 2005/0122926 A1 | 6/2005 | Cromer et al. | |
| 2005/0158697 A1 | 7/2005 | Nelson et al. | |
| 2005/0239036 A1 | 10/2005 | McGar et al. | |
| 2007/0067422 A1 * | 3/2007 | Shibasaki | 709/220 |
| 2008/0254426 A1 * | 10/2008 | Cohen | 434/308 |
| 2010/0052870 A1 * | 3/2010 | King | 340/286.02 |

* cited by examiner

MULTIMEDIA TRAINING SYSTEM AND APPARATUS

TECHNICAL FIELD

The present invention relates to the field of training, such as training for students or members of an organization and, more particularly, to the field of corporate training of employees and contract workers.

BACKGROUND

U.S. Pat. No. 4,764,120 to Griffin, et al. (hereinafter "Griffin") entered the field with a computerized test-taking and balloting system comprised of several keypads that are hard-wired from students' desks to a classroom router. The system may be employed in several classrooms, in which case the test results or ballots accumulated in each classroom router are sent to a central server. Using their individual keypads, students may enter test answers to be scored or ballots to be counted, but Griffin's system is not interactive, and cannot function as a training tool except to the extent to which training results can be measured using the standard classroom lecture and exam format. Furthermore, in his means plus function methodology, neither Griffin's claims nor his disclosure encompass any form of wireless operation.

U.S. Pat. No. 6,535,713 B1 to Houlihan, et al. (hereinafter "Houlihan") recognized the importance of interactive corporate training. In Houlihan's claimed system, each student participates with an individual workstation, defined in Houlihan's Description as including a communications bus, a processor, and dynamic storage media. The student workstation of Houlihan's preferred embodiment even features 64 MB of main memory.

Most training videos and lecture-based training systems currently being used are less affordable than they could be, partially because of the investment required for multiple trainee workstations. More importantly, currently used training systems are less successful than desirable because they are dry, one-dimensional, and unable to maintain user interest for periods of time long enough to convey the desired messages.

Accordingly, there is a need for a method and system which may be used to wirelessly and interactively train students or members of an organization while maintaining user interest for periods of time long enough to convey desired messages. Such method and system should, among other things, allow training without a live instructor and without merely passively watching a video recording.

SUMMARY OF THE INVENTION

The invention includes software referred to herein as Standard Industry Skills Training and Educational Media (SISTEM™), and the hardware and software required for its implementation will herein be referred to as "the present invention." The acronym "PC" will be used herein to refer not only to personal computers, but also to refer to any one or more of a workstation, laptop computer, or any other small to mid-range computer as is commonly understood. Wireless peripheral hardware components such as Infra-Red (IR) or Radio Frequency (RF) response pads, keypads, clickers, and remote control devices will herein be referred to as "remotes."

SISTEM is a training system software that adds an interactive and entertaining alternative to the available state-of-the-art computer-based training methodologies and technologies. SISTEM is designed to minimize the time and cost associated with the typical delivery of training sessions. The SISTEM structure is ideal for dynamic maintenance of up-to-date content and docketing of training requirements, schedules, and certifications of completion. SISTEM provides a complete remote training management and training delivery system for an individual trainee and for a group of trainees simultaneously interacting with a single workstation or PC. Furthermore, the interactions with each group of trainees occur throughout each training session, rather than just during a post-training test.

SISTEM is a computer-based training system for which no computer knowledge or prerequisite training is required for successful participation. SISTEM makes possible the delivery of interactive training to, the recordation of comprehension by, and the acquisition of skills by, language-challenged and under-educated workers. Training groups of such workers requires a different type of pedagogy than that utilized in the education of individuals who already possess good language and learning skills. It is commonplace for teachers and supervisors to believe that under-educated, language-challenged trainees have comprehended lessons that in reality were not fully understood. Thus, text-based teaching applications often do not work. This problem is particularly acute for those for whom English is a secondary language. Many such trainees are embarrassed, afraid, or unable to communicate in a timely manner that a lesson has not been comprehended. SISTEM is particularly designed to enhance the comprehension of under-educated and language-challenged trainees. Therefore, training and re-training time is decreased, and knowledge of training concepts and retention is enhanced. As a result worker safety and competency and product safety are improved and accidents are reduced.

The present invention combines modern hardware and software technology and innovative teaching methods into a means by which employers can seamlessly weave training sessions into literally any kind of working environment, from the classroom to the shop floor or assembly line. Trainee session registration, class activity, and the comprehension of the SISTEM competency-based training material are all recorded through the use of remotes, one of which is issued to each trainee at the time of training. Trainee responses are recorded in real time for processing and feedback. Training overhead is reduced by the consistency and centralization of training management and record-keeping.

SISTEM training can be site-based or web-based, depending on subscriber size, investment, and preference. Herein, e-learning will refer to the web-based learning and training option. Being site-based or web-based, SISTEM can be readily adapted to a wide variety of training environments. The web-based version of SISTEM collects trainee responses through an interactive interface and transmits these responses to a hosted web server central processing unit (CPU). The server distributes training content for web-based SISTEM, and acts as a database for trainee information.

The site-based version of SISTEM comprises of the client-side software application that resides on a local PC disk drive and an integrated IR receiver or RF receiver connected to the PC via a USB port. The system allows individual trainees or groups of trainees to be interactively registered, trained, and tested using IR or RF remotes and a single PC. After completing the registration process the SISTEM software application keeps track of the remote ID that is assigned to each trainee. This way the software is able to record and store the exact answers that each trainee in the group provides to each question in each training course. This information is stored on the local PC and transmitted to the SISTEM web-based application over the Internet. By running the SISTEM web-based application using a browser, supervisors and training managers can then view various reports listing how the trainees performed individually and as a group in various courses. If an Internet connection is not available to the local PC, then the information simply accumulates on the local PC and is transmitted en masse the next time an Internet connection is available. The security of all sensitive data in SISTEM is protected at all stages of collection, transmission, and storage. Security is addressed through industry accepted practices. Sensitive personal information is stored in an encrypted data format and transmitted through secure data tunnels.

The SISTEM philosophy of pedagogy is primarily based on research that shows (1) trainees learn and retain information better when there is a story or significant visual metaphor to attract and hold their attention; (2) the optimal attention span for under-educated trainees is approximately ten minutes; (3) trainee involvement and interactivity throughout a training session increases retention and participation; (4) group activities increase retention and team building; and (5) workplace training is more effective if the training is directly related to workplace experiences.

In operation, a SISTEM session begins with an introductory video that exaggerates a common workplace or life skills issue, and then encourages trainee participation with rhetorical questions that review the theme of the video and preview the lesson. After viewing a tutorial on the session's targeted competencies, the trainees are asked to demonstrate competency by answering related questions. All competency-based questions and answers are monitored, and corrections are applied through feedback loops. The number of feedback loops is determined by an acceptable success rate. When all of the concepts have been covered and questions answered, the trainees play a game based on the training session content, and an exit video reinforces the rewards of understanding and applying the competencies learned in the lesson.

The SISTEM training courses preferably show, in an entertaining video, how a workplace or life situation can be handled poorly and, through subsequent tutorials, how that situation could be handled correctly. The video presents a visual metaphor for the issue to be taught in a particular training course. One preferred embodiment combines presentation with interaction, in the form of rhetorical questions designed to engage and reinforce understanding. Example questions such as "What is an appropriate response?" and "Do you think that the man in the video was angry?" encourage trainees to participate by interactively answering questions based on what they have just learned. The questions are also designed to reinforce the core content through the use of visual images.

In one embodiment of the invention, competency-based questions are presented with colorful pictures as visual aides. Scored questions demonstrate trainee competency during and after presentation of the instructional material. Each question illustrates an instructional point that has just been presented. Each trainee must demonstrate 100 percent competency on each topic before the group can progress to the game section. When any trainee answers a question incorrectly, the topic concept is presented to the group again but in a much shorter format, and a similar but different question is presented for the entire group to answer with their individual Remotes. No one in the group knows who missed the question originally, including the person that missed it. All question and answer records are stored confidentially on the PC. If someone in the group misses the second question, then the concept is presented one more time followed by a third question on the same topic. If the group receives less than 100% correct by all trainees on the third question, then, regardless of the score, the course software provides the correct answer and continues to the next concept. This pedagogy is unique by encouraging the class to work together as a group and make sure that each individual understands every concept in the course. This is especially important in corporate industrial training where the goal is for each trainee to master each concept. Any trainee who does not answer at least one of the three questions correctly for each concept does not get credit for completing the course. Supervisors can run completion reports after a group finishes a course and the training records are transmitted to the server. The Supervisor can then reschedule people who did not receive credit for a course.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning radio communication, computer programming, and the like have been omitted inasmuch as such details are not considered necessary to obtain a complete understanding of the present invention, and are considered to be within the skills of persons of ordinary skill in the relevant art.

Figure 1:
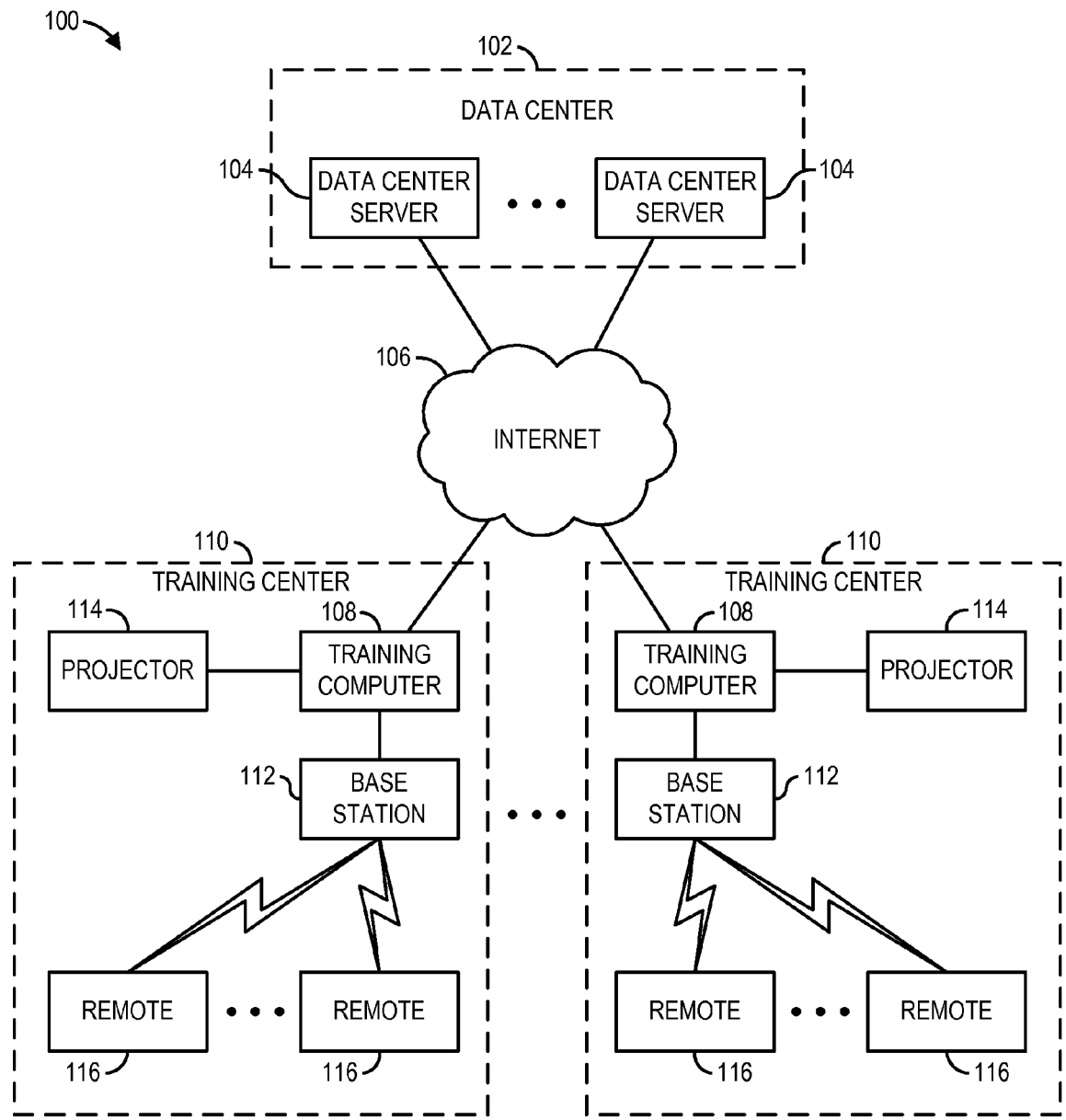
FIG. 1 is a high-level conceptual block diagram illustrating a web-based system embodying features of the present invention.

Referring to FIG. 1 of the drawings, the reference numeral 100 generally designates a system embodying features of the present invention for providing interactive web-based training. The system 100 is also referred to as a Standard Industry Skills Training and Educational Media (SISTEM™) Platform. As described in further detail below, the system 100 includes a Data Center 102, such as a physical building at a hosting location having one or more web-based (i.e., Internet-based) data center servers 104. The data center servers 104 host the SISTEM Learning Management System (LMS) software, a web-based application that automates the administration of training courses and the management of training plans and training records, such as accessing trainee records, generating reports, exporting training data such as employee and trainee personnel information, and the like.

The one or more data center servers 104 are coupled via a network, such as the Internet, 106, to one or more training computers 108 located at one or more training centers 110. Each training computer 108 includes a memory and a processor configured for executing instructions set forth in software stored in the memory, and is preferably exemplified as any one or more of a personal computer (PC), workstation, laptop computer, other small to mid-range computer as is commonly understood, custom-made computer to reduce the number of components, any commercially-available device that provides group-based training capabilities, or the like. Software stored in memory preferably includes SISTEM Group-Based Training (GBT) software, a client-side software application that includes training courses and manages interactive responses between trainee remotes 116 (discussed below) and a base station (discussed below) 112 and the host data center server 104 in a group format. As discussed in further detail below, the SISTEM GBT also includes a user interface to facilitate the creation of playlists of training courses, the selection of trainees in a class, the downloading of trainee information from the SISTEM LMS, and uploading training records to interface to the SISTEM LMS. As depicted by FIGS. 4-8, during training, the SISTEM GBT preferably delivers the training courses and the training processes, generates training records and stores them on the training computer 108, and subsequently uploads the training records to the SISTEM LMS on the data center servers 104.

In a preferred embodiment of the invention, a training company operates and maintains the SISTEM LMS at the Data Center 102 (the physical Data Center being independently owned and operated by a third party). Furthermore, one or more training centers 110 having training computers 108 with SISTEM GBT installed thereon are owned and utilized by each of a number of different business organizations, such as corporations that have a need for standard industry skills training and educational media.

Figure 3:
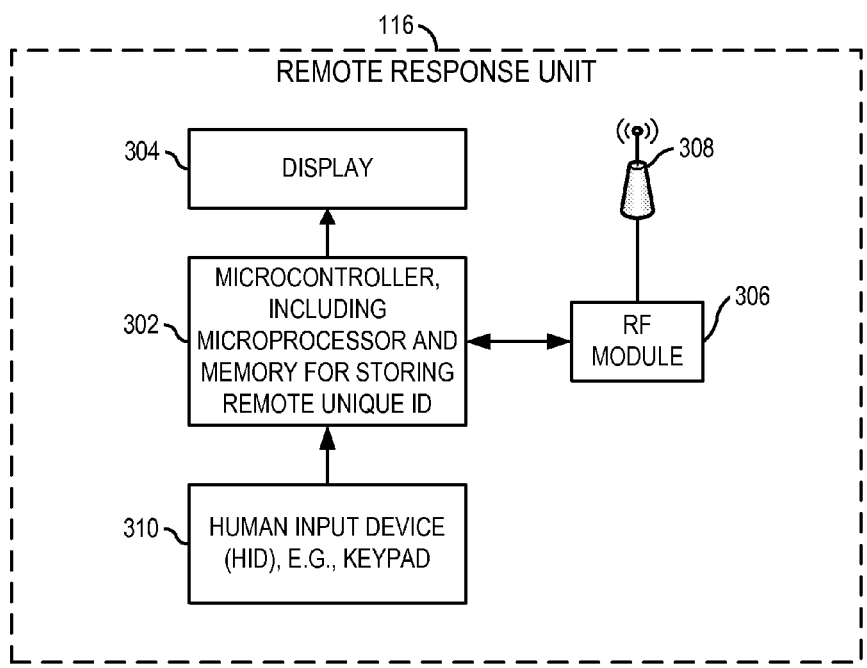
FIG. 3 exemplifies details a remote response unit depicted in the embodiment of FIG. 1.

In addition to the training computer 108, each training center 110 further comprises a base station 112 and a projector 114, both coupled to the training computer 108. Each base station 112, discussed in further detail below with respect to FIG. 3, is wirelessly coupled (e.g., via radio frequency (RF) or infrared (IR)) to one or more remote response units 116, discussed in further detail below, with respect to FIG. 4. Each remote response unit 116 is preferably assigned to one participant, student, or trainee (including, e.g., employees, contract workers, members of an organization, hereinafter "trainee") in a class. The projector 114 represents any device effective for displaying or projecting an image to a large group of trainees, such device as a Digital Light Processing (DLP) projector, a Liquid Crystal Display (LCD), a conventional monitor, a large screen plasma HDTV, or the like. In an alternative embodiment of the present invention, the base station 112 may be integrated with the training computer 108 for operation as a single device.

Figure 1A:
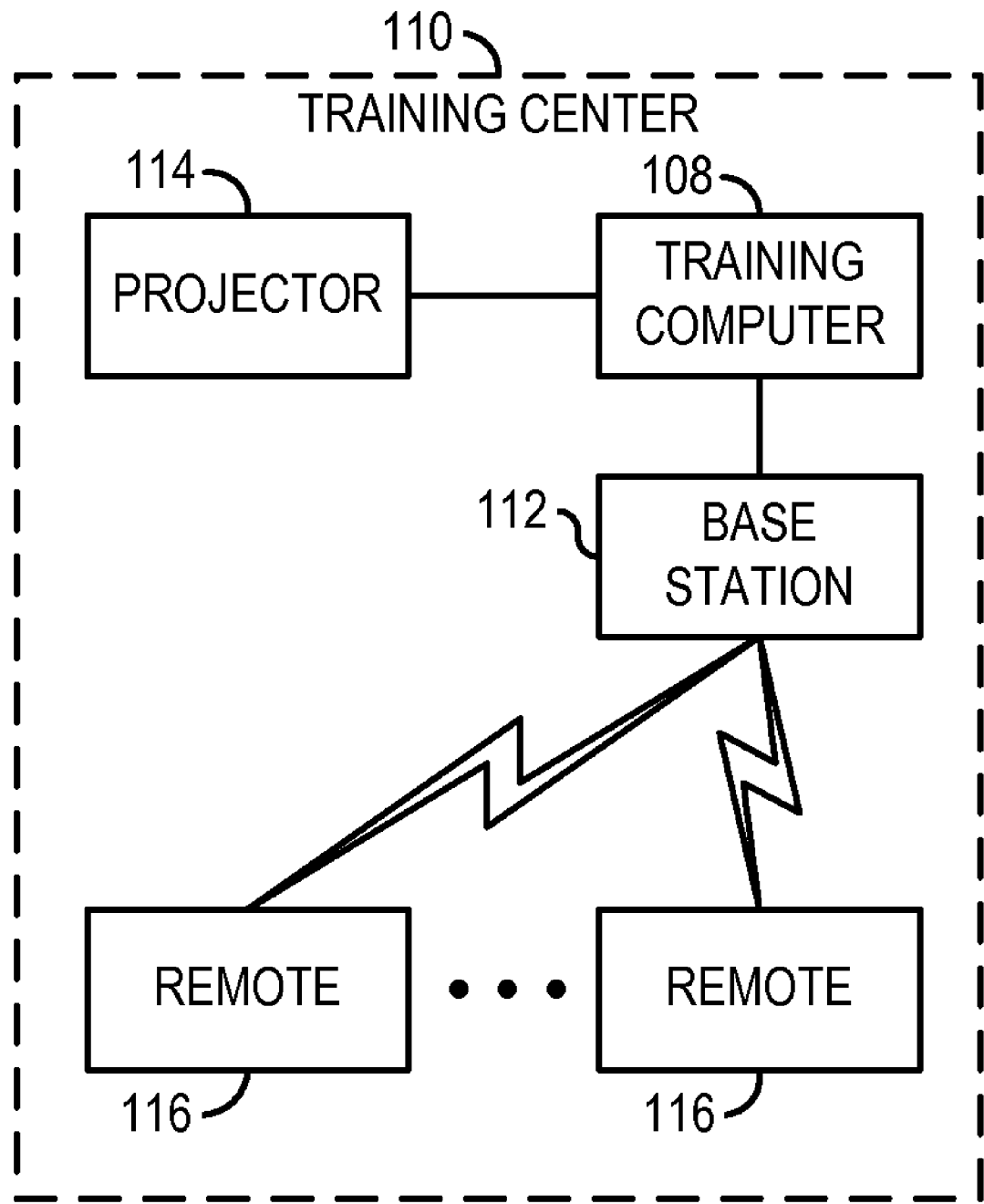
FIG. 1A is a high-level conceptual block diagram illustrating a site-based system embodying features of the present invention.

FIG. 1A exemplifies an alternate embodiment of the invention, namely, a site-based system embodying features of the present invention. It includes a training center 110 as in FIG. 1, but is not coupled to a Data Center 102 and does not include the SISTEM LMS discussed above with respect to the Data Center 102 of FIG. 1. The SISTEM GBT software resides on the training computer 108.

The aforementioned SISTEM GBT software is a modular software application program having a number of training courses (or modules), and each course is based on a common pedagogical template. The pedagogical templates preferably store art, video, and audio files in folders accessible only to a SISTEM LMS Director, who may modify or update system applications one file at a time or en masse via Internet connectivity. Clients (i.e., customers or end users of the training courses) can also create, maintain, modify, and update their own training courses and deliver them through the SISTEM GBT.

The SISTEM GBT is preferably operable in two different modes, an Administration Mode and an Instruction Mode. The Administration Mode has functional and navigation capabilities that are not available in the Instruction Mode. The Instruction Mode (FIG. 5) has a linear path navigation capability that does not allow a return to previous pages or the skipping of sections. The Administration Mode offers the freedom to navigate with a mouse and keyboard, and allows the facilitator to synchronize databases, enable and disable feedback questions, enable and disable games, change administrator passwords, and send email.

SISTEM LMS is preferably configured for integration with known programs for managing learning experiences. For example, SISTEM LMS is often utilized for synchronized bi-directional data flow. Other options of SISTEM LMS include integration with software providers such as SAP AG and Oracle, Inc. One embodiment of the present invention incorporates the commonly understood concept of Just-in-Time Training (JITT) also referred to as eLearning. All features of the SISTEM LMS training system can preferably be delivered on demand over the Internet using a web browser such as Firefox and at the point of need so that critical training may be accomplished immediately when and where it is needed.

Figure 2:
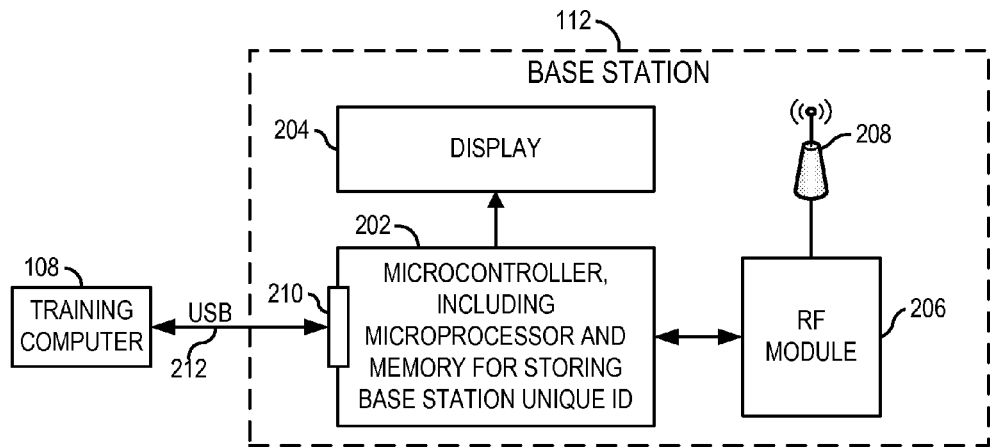
FIG. 2 exemplifies details a base station depicted in the embodiment of FIG. 1.

With reference to FIG. 2, the base station 112 is exemplified as comprising a microcontroller 202, preferably including, e.g., a microprocessor and onboard memory, such as non-volatile random access memory (NVRAM), for storing, for example, software instructions executable by the microprocessor, and data, such as an identification (ID) that is preferably unique among the base stations 112 and remote response units 116 of the system 100. The microcontroller 202 is preferably coupled to a simple display 204, with LEDs that provide basic operational status, or alternatively a larger LCD screen that provides real-time data analysis of responses from the remotes. The microcontroller 202 is also preferably connected to a radio frequency (RF) module 206, including an antenna 208, for effecting a wireless communication link with each remote response unit 116. The microcontroller 202 further preferably includes a port 210, such as a USB port, for coupling the CPU to the training computer 108 via a USB cable 212.

With reference to FIG. 3, the remote response unit ("remote") 116 is exemplified as comprising a processor, or microcontroller, 302, preferably including, e.g., a microprocessor and onboard memory, such as NVRAM, for storing, for example, data, such as an ID that is unique among the base stations 112 and remote response units 116 of the system 100. The microcontroller 302 is preferably coupled to a human input device (HID) 310, such as a keypad, keyboard, or a mouse, to a display 304, such as a set of LEDs displaying operational status and communication success with the base station 112 or a more sophisticated LCD screen displaying trainee input and feedback from the training computer 108 and base station 112. The microcontroller 302 is also preferably paired with a radio frequency (RF) or infrared (IR) module 306, including an antenna 308, for effecting a wireless communication link with an antenna 308 of a respective base station 112. The remote 116 is preferably configured so that when a trainee simply enters a response into the remote, the remote takes care of transmitting the response to the base station without further input from the trainee. Thus, according to principles of the present invention, the remote 116 does not require that a trainee perform a separate second step to transmit a response after the response has been entered into the remote.

The base station 112 and each remote 116 may be configured to permit testing that entails accepting a number of different answers from each remote 116. Such configuration may require special software such as a helper application, perhaps an Active-X control, to collect the trainee responses from the remotes that are stored in the base station and transmit these responses to the SISTEM program. Successful registration of a response and/or correct and incorrect responses can be displayed if desired.

The module 306 is preferably an RF radio transceiver (e.g., the Nordic™ Nrf24L01) configured to provide a bi-directional communication path with a respective base station 112, and includes buffers (as a part of the microcontroller 302) that are polled by the SISTEM software to collect votes and answers. RF remotes optionally include a light under each button that glows individually to provide feedback to a trainee that the signal transmitted by a respective button on the remote has been received by a respective base station 112. A remote operative via an RF link is preferable over a remote operative over an IR link because the bi-directionality of RF virtually eliminates lost or corrupted votes and answers. Furthermore, since IR remotes are unidirectional, a base station may not poll the remote when votes need to be cast, and responses from IR remotes may be close enough in time to cause interference with each other. RF communication is also faster, has a longer range, and does not require line-of-site with the base station 112 (RF signals travel through people, walls, etc.). The bidirectional capabilities of RF can also be used to provide feedback to a trainee for such things as indicating when a response has been received by the base station 112, and the like. A similar method can be used for one-to-one communication between a trainee and the SISTEM software; for example, the name of a trainee can appear on the remote display 304 so a trainee can confirm that his/her remote is correctly associated with him/her.

Figure 4:
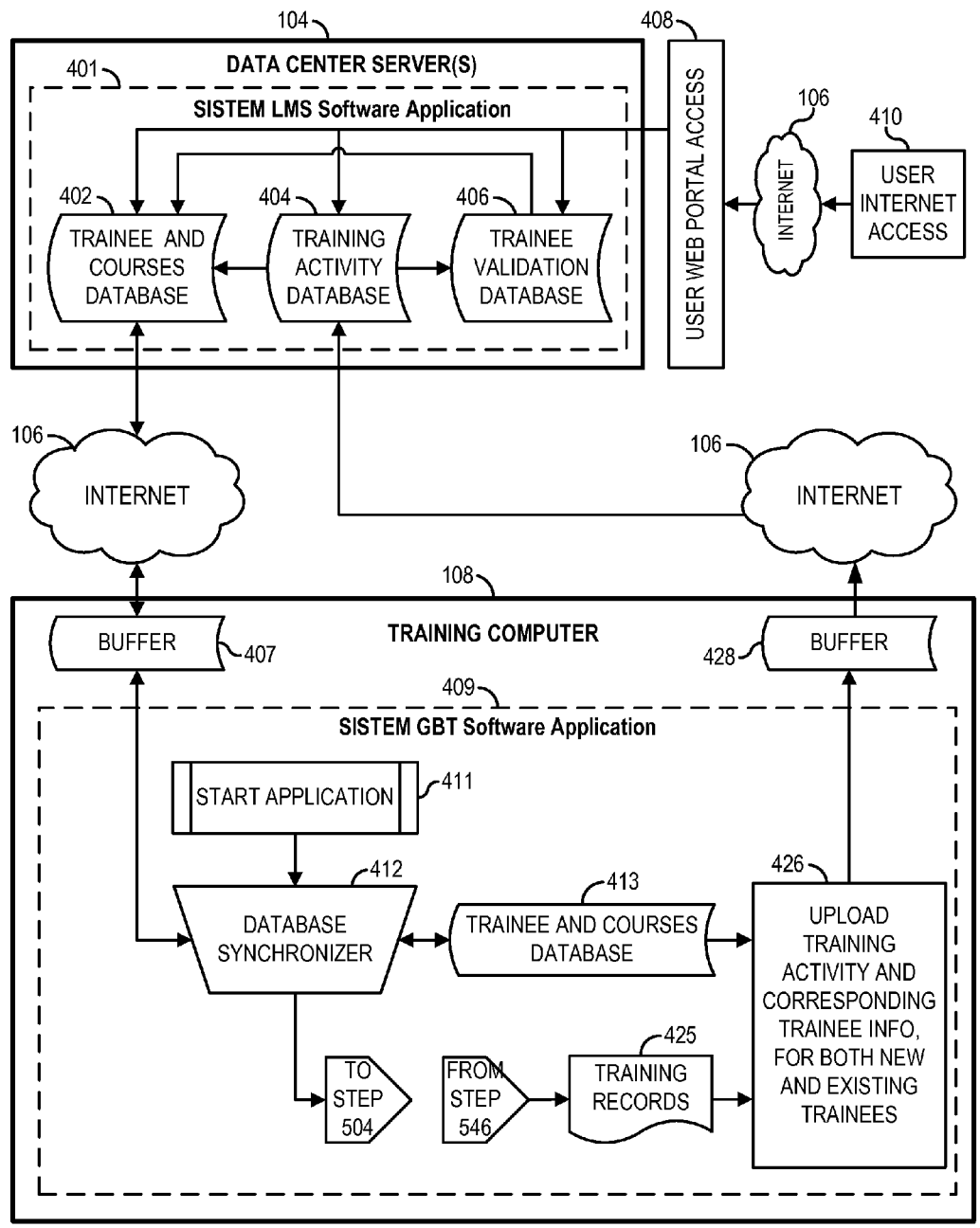
FIG. 4 depicts the training computer coupled to a data center server as depicted in the embodiment of FIG. 1.

FIG. 4 is a high-level block diagram of the SISTEM platform 100 including components in the Training Computer 108, the connection via the Internet 106 between the Training Computer and the Data Center 102, and a diagram of a data center server 104 and Web interface 106 to the data center server 104. The Data Center 102 comprises data center servers 104, which collectively host the SISTEM LMS software application 401. This includes storage and operation of databases 402, 404, and 406 and web-based software interfaces to these databases. The trainee and courses database 402 stores identification information about trainees and the courses that are available. The training activity database 404 stores data relating to training records of what courses each trainee has completed in the past and the courses in which they are currently enrolled. The trainee validation database 406 stores information about trainee accounts that are pending and waiting for approval after which they are automatically added to the trainee and courses database 402. The three databases 402, 404, and 406 interact directly with each training computer 108. Updates to the first database 402 and compilations of trainee demographic information are preferably transmitted to a respective training computer 108 via a secure Internet communication link 106, resulting in either the addition or deletion of trainee names from an enrollment menu maintained in a respective training computer 108. The data center server 104 maintains in the training activity database 404 a documented record of competency for all training courses attempted by an individual.

Subscribers may authorize certain persons to access the data center servers 104 via a user web portal allowing them to access components of SISTEM LMS 410 and 408. With authorized access, such persons may add and delete trainee names, validate trainees, track a trainee's training activity, create training courses, create and run reports, and export training records. Trainee information may also be automatically updated through data communication links with a subscriber's human resource management system. As a subscriber database, the servers 104 further include trainee demographic information, training logs, a new trainee validation queue, and the like. The servers 104 also include functions for course creation and report generation. Furthermore, the user web portal access 408 provides an interface for trainees to alternatively take courses using a website browser and Internet connection. This option requires permission from the subscriber supervisors and the training format is one-to-one between the trainee and the course. In contrast the training computer 108 provides the group-based training format using remote controls.

In the operation of the invention, and before training sessions begin, at step 411, the training supervisor starts the SISTEM GBT Software Application 409 which initiates database synchronization 412 via a buffer 407 between the data center server 104 and the Trainee and Courses Database 413. This ensures that the training computer has the latest personnel and course information including course listings, new trainees, and inactive trainees. Next in the preferred embodiment, the supervisor uses the SISTEM software to select the local and/or foreign language that will be used during training and subsequently enrolls and trains the group of trainees in the appropriate courses as described in further detail below with respect to FIG. 5, beginning at step 504. Upon completion of FIG. 5 at step 546, the training activity and results for each trainee (stored at step 534 of FIG. 5) are added as training records to a file repository 425. If an Internet connection is available, then at step 426, all new training records 425 and new trainees added to the database 413 are uploaded via a buffer 428 to the training activity database 404 in the data center server 104.

Figure 5:
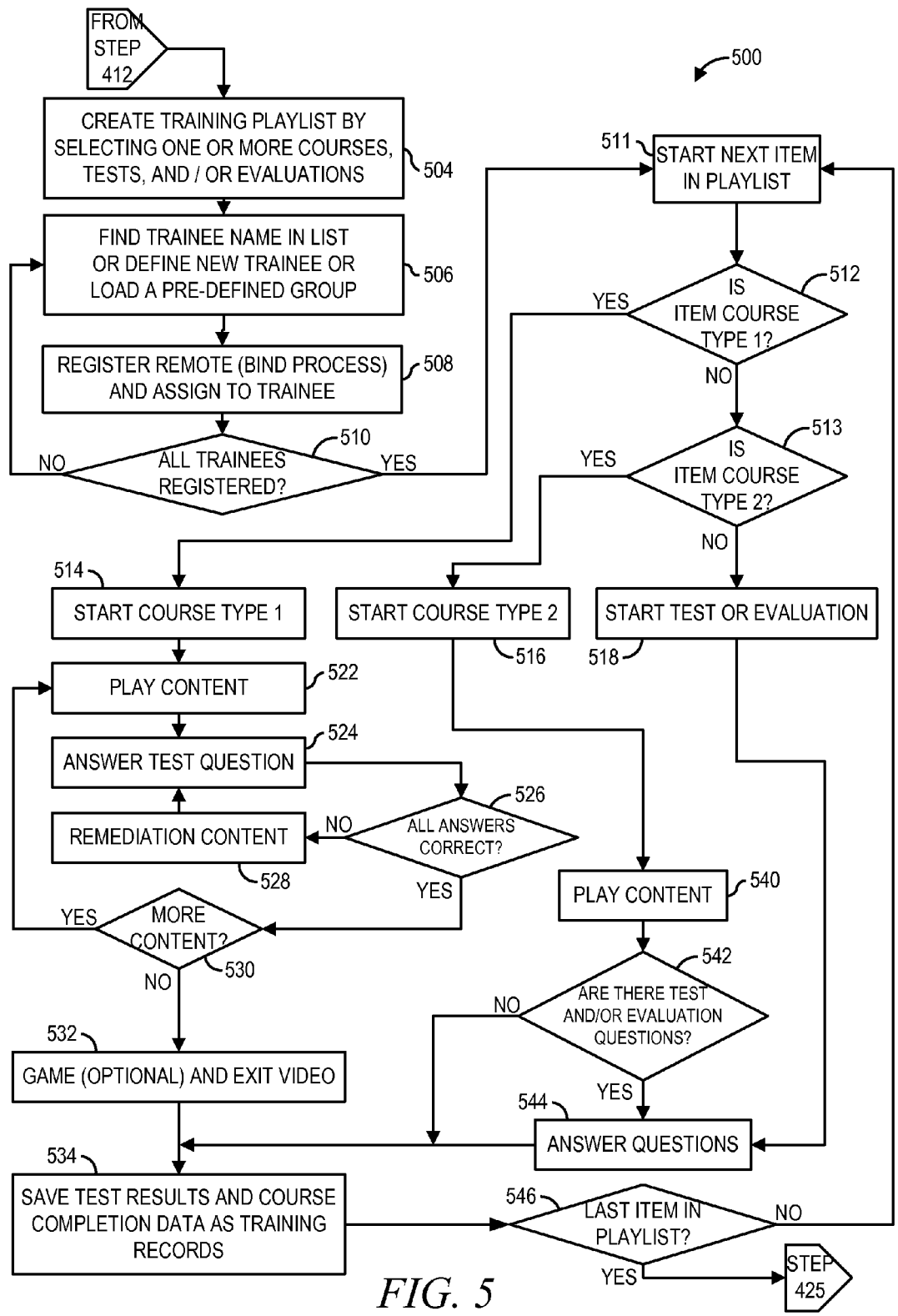
FIG. 5 is a flow chart illustrating control logic for performing enrollment and training in accordance with principles of the present invention.

FIG. 5 exemplifies a flowchart 500 of control logic implemented by the training computer 108 for performing enrollment and multimedia training in accordance with principles of the present invention. The process is initiated at step 411, at which a facilitator or supervisor ("facilitator") starts the SISTEM application, and at step 504, the facilitator creates a training playlist by selecting one or more courses, tests, and/or evaluations ("items") from a list of items. The SISTEM software may further include a menu of options, in addition to Course Selection, such as Admin Login, Help, and Quit. Admin Login allows supervisors to enter the admin area of SISTEM, the Help feature provides information about the software's functions, operation, and navigation icons, and Quit allows users to exit the program.

Once the facilitator selects a training playlist, at steps 506-510, trainees registered for the class are ascertained by identifying a trainee in a list of trainees or defining a new trainee or loading a pre-defined group (step 506). The next step is to register a remote 116 to a trainee (step 508) using a binding process, as discussed in further detail below with respect to FIG. 6, and at step 510, repeating steps 506 and 508 for each trainee until all have been assigned a remote. If it is determined at step 510 that all trainees have been registered, then execution proceeds to step 511, wherein the first or next item in the playlist is initiated. At step 512, a determination is made whether the first or next item in the playlist is a Course Type 1, that is, a traditional SISTEM course with the embedded questions and remediation loops. If it is determined at step 512 that the first or next item in the playlist is a Course Type 1, then execution proceeds to step 514; otherwise, execution proceeds to step 513. At step 513, a determination is made whether the first or next item in the playlist is a Course Type 2, that is, a course that a client creates that may follow a different instructional design format from a Course Type 1. For example, a Course Type 2 may be a PowerPoint presentation that the client uses for training purposes. For use following the PowerPoint presentation, the client may create one or more SISTEM Test or Evaluation questions that trainees answer with their respective remotes 116. If it is determined at step 513 that the first or next item in the playlist is a Type 2 course, then execution proceeds to step 516; otherwise, execution proceeds to step 518 in which a test or evaluation is presented to the trainees, described in further detail below.

At step 514, Course Type 1 is initiated, and at step 522, the content for the course is played, which content may include an entertaining, possibly humorous, situation. Stimulating and entertaining video windows may animate into and out of the projector viewing screen 114 as appropriate in various sizes relative to the content of any particular training course. A video preferably does not take over an entire viewing screen 114, but rather, it preferably leaves room for trainee instructions and responses. At step 524, test questions are presented to trainees and the trainees answer the questions using their respective remotes 116. At step 526, a determination is made whether or not answers given in response to test questions are correct. At step 526, if it is determined that any answer from any trainee is incorrect, then execution proceeds to step 528 wherein remediation content is preferably given to all trainees at the same time, preferably relating to the incorrect answer, and then execution returns to step 524. In a preferred embodiment, remediation is performed up to two times for each test question, and the remediation learning content is shorter and faster than the original content so as not to hold up an entire class for very long. If a trainee fails to answer a test question correctly after two remediations, then the trainee is given an incomplete and is required to re-take the course at a later time.

If at step 526, it is determined that all questions were answered correctly, then execution proceeds to step 530 wherein a determination is made whether there is more content to present in the selected course. If it is determined that there is more content to play, then execution returns to step 522; otherwise, execution proceeds to step 532, wherein a preferably fast-paced, entertaining game may be played to reinforce what the trainee has learned and leave the trainee with a positive impression of the training experience. By way of example, the winner of the game is declared based on the first trainee to answer the most Yes/No or True/False questions correctly. No score is reported in the game section, and the session preferably ends with a video that demonstrates how beneficial results can come from real-life situations in which the trainees have assimilated the competencies taught in the training session. At a trainee's discretion, tactile or kinetic exercises may be employed to complete the training experience and engage the trainee in the richest learning experience possible. The kinetic exercises can be as simple as deep-breathing for relaxation, or more complicated exercises if lesson reinforcement is needed. For example, one optional exercise is the creation of a household budget using fake money supplied by the facilitator. At employer discretion, prizes may be awarded to winners of the games at the end of training sessions. Finally, an exit video is played that reinforces the learning objectives.

At step 534, the results from the test questions and data identifying trainees who have completed the course is saved as training records in the training computer 108. Records at the Data Center 102 are updated automatically as each trainee takes a course, and each trainee's records are individually maintained for certification and compliance verification. Preferably records cannot be altered by any employee, trainee, or supervisor; only a Data Center Director with authority and password-protected access over the data center servers can make such alterations of records. Once training records are made accessible, they are preferably accessible via a variety of categorical sorts including, for example, Trainee Name, Completion Status by Course, Completion Status by Trainee, Overall Progress Report, and the like. At step 546, a determination is made whether or not there are any more items to play from the playlist selected at step 504. If it is determined that there are no further items to play, then execution proceeds to step 425 of FIG. 4, discussed above; otherwise, execution returns to step 511 and the next item is automatically run, thereby facilitating the training of larger groups of trainees without having to re-register each trainee at the start of each training session.

At step 516, the Course Type 2 is initiated and, at step 540, the content for the course is presented to the trainees. At step 542, a determination is made whether there are any test and/or evaluation questions to present to the trainees, and if there are not, then execution proceeds to step 534, discussed above; otherwise, execution proceeds to step 544 wherein test and/or evaluation questions are presented to trainees and the trainees answer the questions. Execution then proceeds to step 534, discussed above.

At step 518, a test and/or evaluation is initiated, and execution proceeds to step 544, discussed above.

If in the execution of the steps of FIGS. 4 and 5, the training computer 108 is disconnected from the Internet, that is, from the data center servers 104, training records may accumulate on the training computer 108. When the training computer 108 is re-connected via the Internet to the data center servers 104, the SISTEM GBT 409 transmits (uploads) the accumulated training records, preferably all training records, new and old, to SISTEM LMS 401.

Figure 6:
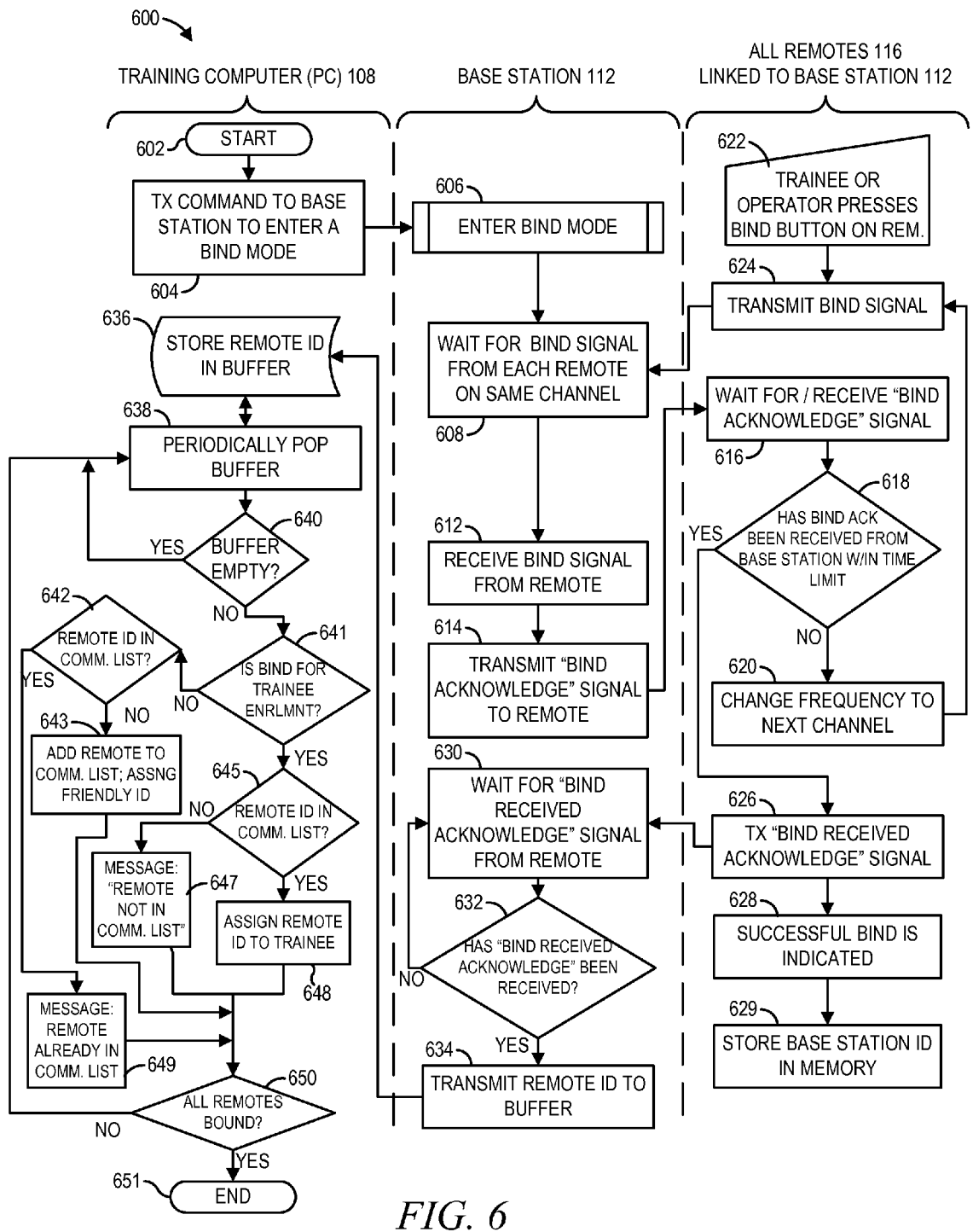
FIG. 6 is a flow chart illustrating control logic for performing a binding process in accordance with principles of the present invention.

FIG. 6 exemplifies a flowchart 600 of control logic implemented by the base station 112, the training computer 108, and the remote 116 for binding a remote 116 to a base station 112 in accordance with principles of the present invention.

The binding process has two purposes. First it is used to add the serial number of a remote 116 (remote ID) to a Communication List stored on the training computer 108. The Communication List is stored in the form of a computer file, database, or the like. The base station 112 and training computer 108 will only communicate with remotes 116 whose remote IDs are included in the Communication List. In this way the base station 112 and training computer 108 will not respond to spurious wireless signals from other equipment or networks in the area, and they will not respond to remotes 116 that are assigned to a different training computer 108, perhaps in an adjacent room. Furthermore, during the assignment of a remote ID to the Communication List, a "friendly" ID (whole number, e.g., 1, 2, 3, . . . ) is assigned to the remote ID and also stored in the list. The friendly ID is also applied to the remote 116 so that it is readily visible to a trainee, by such means as the application of a removable sticker to the remote. During training, the SISTEM GBT software identifies the remote 116 by the friendly ID and this is an easy way for the trainee to identify their respective remote. For example, during a question, SISTEM provides at the bottom of a display screen a list of friendly IDs for remotes that have not submitted an answer. The list is preferably automatically updated by the software such that when a remote successfully submits a response, its friendly ID is dynamically removed from the list at the bottom of the screen. In the preferred embodiment the software does not continue past a question until all remotes have provided an answer. The friendly ID list at the bottom of the screen is an efficient way for the entire class to identify the remotes that have not provided an answer. Additionally in the preferred embodiment, the SISTEM GBT software provides the supervisor with an option to also display the trainee's last name at the bottom of the screen alongside their friendly ID corresponding to the remotes that have not successfully submitted an answer. In summary, before a training computer 108 is ready for use, a one-time assignment using the bind process and SISTEM GBT software must take place between each remote 116 and the computer 108. This action adds the remote ID to the Communication List, generates a friendly ID and gives the operator the opportunity to apply the friendly ID sticker to the back of the remote 116.

The second purpose for the bind process is to complete student enrollment as illustrated in step 508 (FIG. 5). This action completes the assignment of remote 116 to trainee and trainee to training course. It is also noted that the binding process 600 must be completed before the remote 116 can operate in an Answer mode 700, discussed below with respect to FIG. 7.

With reference to FIG. 6, the binding process 600 is initiated at step 602, and at step 604, the computer 108 transmits a signal to the base station 112 directing the base station to enter into a bind mode. At step 606, the base station 112 receives the command from the computer 108 and enters into a bind mode. At step 608, the base station waits for a BIND signal from a remote 116. At step 622, a trainee or operator directs a respective remote 116 to transmit a BIND signal (e.g., by pressing a Bind button), and in step 624, the remote transmits a BIND signal on the last channel used for communication between the base station 112 and the remote 116. At step 608, the base station 112 receives the BIND signal from a remote 116, provided that the signal is sent on the same channel that the base station is operating. At step 612, the signal from the remote 116 is received by the base station 112. At step 614, the base station 112 transmits a BIND ACKNOWLEDGE signal to the remote 116 to let the remote know that that base station received the BIND signal from the remote. At step 616, the remote 116 waits for the BIND ACKNOWLEDGE signal from the remote 116, and upon receipt of same, at step 618 determines whether the remote received the BIND ACKNOWLEDGE signal from the base station within a predefined time limit, such as 0.25 seconds, subsequent to sending the BIND signal in step 624. If it is determined that the remote did not receive the BIND ACKNOWLEDGE signal within the predefined time limit, then execution proceeds to step 620 in which the frequency is changed to the next channel, and execution returns to step 624; otherwise, execution proceeds to step 626. At step 626, a BIND RECEIVED ACKNOWLEDGE signal, including the remote ID, is transmitted to the base station 112 and execution proceeds to step 628 in which some form of indicator, such as LED's, are illuminated on the remote 116 indicating that the remote has been successfully bound to the base station 112. The remote 116 preferably also stores the base station ID in memory in step 629. All subsequent communication between the remote 116 and the base station 112 is then pre-qualified by the remote 116 checking the base station ID with the ID stored in memory on the remote 116. If the IDs do not match, then the remote 116 will not respond.

At step 630, upon receipt by the base station 112 of the BIND RECEIVED ACKNOWLEDGE signal transmitted by the remote 116 in step 626, execution proceeds to step 632. At step 632, if the base station has received the BIND RECEIVED ACKNOWLEDGE signal from the remote, then at step 634, the remote ID is transmitted to a buffer of the computer 108, and in step 636, the remote ID is stored in the buffer of the computer 108. If at step 632 the base station does not receive the BIND RECEIVED ACKNOWLEDGE signal, then it cycles back to 630. This wait cycle might continue indefinitely if a remote is not operating correctly. In these cases, the trainee or training supervisors are instructed to issue a cancel command breaking the wait cycle, then set the remote aside and use a different remote. At step 638, the computer 108 periodically pops (i.e., checks or asks) the buffer to determine whether the buffer is storing a remote ID. If a remote ID has been stored in the buffer, then the remote ID is retrieved and deleted from the buffer. If more than one remote ID has been stored in the buffer, then the oldest remote ID is retrieved and then deleted from the buffer. At step 640, the computer 108 determines whether or not a remote ID has been retrieved, that is, whether or not the buffer is empty. If a remote ID has not been retrieved, i.e., the buffer is empty, then execution returns to step 638; otherwise, execution proceeds to step 641.

At step 641 a determination is made based on what mode of the SISTEM GBT software is being utilized, the Administration Mode or the Instruction Mode. Trainee enrollment 500 is part of the Instruction Mode and utilizes the bind process 600 to pair a remote 116 to the base station 112 and assign the remote 116 to a trainee. The Administration Mode provides an interface that utilizes the bind process 600 to provide a means for an operator or supervisor to add remotes 116 to the Communication List and generate "friendly" ID numbers.

If, at step 641, SISTEM GBT software is in Administration Mode when the bind process 600 is initiated, then remotes 116 are being added to the Communication List and execution proceeds to step 642 wherein the computer 108 first checks to see if the remote ID is already in the Communication List. If the answer is yes, then a message is presented in step 649 to the operator indicating same. If the answer is no, then in step 643 the remote ID is added to the list and the computer 108 assigns a "friendly" ID to the remote 116 and displays the number on the screen. In the preferred embodiment, the friendly ID is an easy-to-remember whole number between 1 and 255 and is unique to the group of remotes 116 assigned to the computer 108. In this way up to 255 remotes can be used in one training class. In other embodiments, the number could be significantly higher to support additional remotes. Also in the preferred embodiment, when the friendly ID is displayed on the computer screen 108 in step 643, the operator preferably applies a sticker with the same number to the back of the remote 116. In either case, after step 643 or 649, execution proceeds to step 650 wherein a determination is made whether all remotes have been bound. If all remotes have not been bound, then execution returns to step 638; otherwise, if all remotes have been bound, then an operator or supervisor can end the process in step 651.

If, at step 641, the SISTEM GBT software is in Instruction Mode, then the bind process 600 was initiated during trainee enrollment 500, and execution proceeds to step 645 wherein the computer 108 checks to see if the ID for the remote 116 is included in the Communication List. If it is not in the list, then in step 647 the computer 108 provides the trainee with a message indicating that the remote 116 is not in the list, and it must be added before the remote 116 can be used for training. If the remote 116 is in the list, then in step 648, the SISTEM GBT software assigns the trainee to the remote 116. Upon completion of steps 647 or 648, execution proceeds to step 650 wherein, if all the remotes are bound, a supervisor or trainee will stop the process and end execution at step 651. Otherwise the process cycles back to step 638.

In the preferred embodiment, each remote ID is generated and assigned during manufacturing, and it is unique and is stored in non-volatile memory in a respective remote 116. Furthermore, it can preferably only be changed by using a manufacturing reset process. Likewise, each base station 112 has an ID that is generated and assigned during manufacturing, and it is also unique and is stored in non-volatile memory in the base station, and it can preferably only be changed by using the manufacturing reset process.

Additionally in the preferred embodiment the last channel used for communication between a remote 116 and a base station 112 is stored in non-volatile memory by both devices. The next time the remote is powered up and goes through the bind process, the first frequency it uses for transmission is the last one used in the previous training session. Considering that training supervisors rarely have a need to change frequencies, the result is that there is a high probability that each remote binds with the base station on the first attempted frequency, i.e., the answer to 618 is "Yes" in a high percentage of cases. This significantly speeds up the binding process.

In another preferred embodiment of the present invention, the binding process, discussed above with respect to FIG. 6, is eliminated from the enrollment process (FIG. 5, step 508) by storing the binding state in non-volatile memory in the remote 116, and the assignment of a trainee to a remote 116 is stored in memory or other computer-readable storage in the computer 108. In this manner, binding and assignment of the remote to the trainee would only be necessary one time before a remote 116 is used with a specific training computer 108. If a remote 116 is moved to a different training computer 108, then binding and assignment to trainee would be repeated with the new training computer. This embodiment would require that each trainee have their own unique remote that is not used by any other trainee.

In an alternate preferred embodiment, the binding information is stored in non-volatile memory in the remote and in computer-readable storage in the computer 108, but the assignment of remote to trainee would not be stored after the devices are powered down. In this way trainees do not need unique remotes 116 (they can use a different remote 116 in each training session) and yet the pairing of remote 116 to base station 108 during enrollment can be eliminated. Assignment of remote to trainee is still required.

Figure 7:
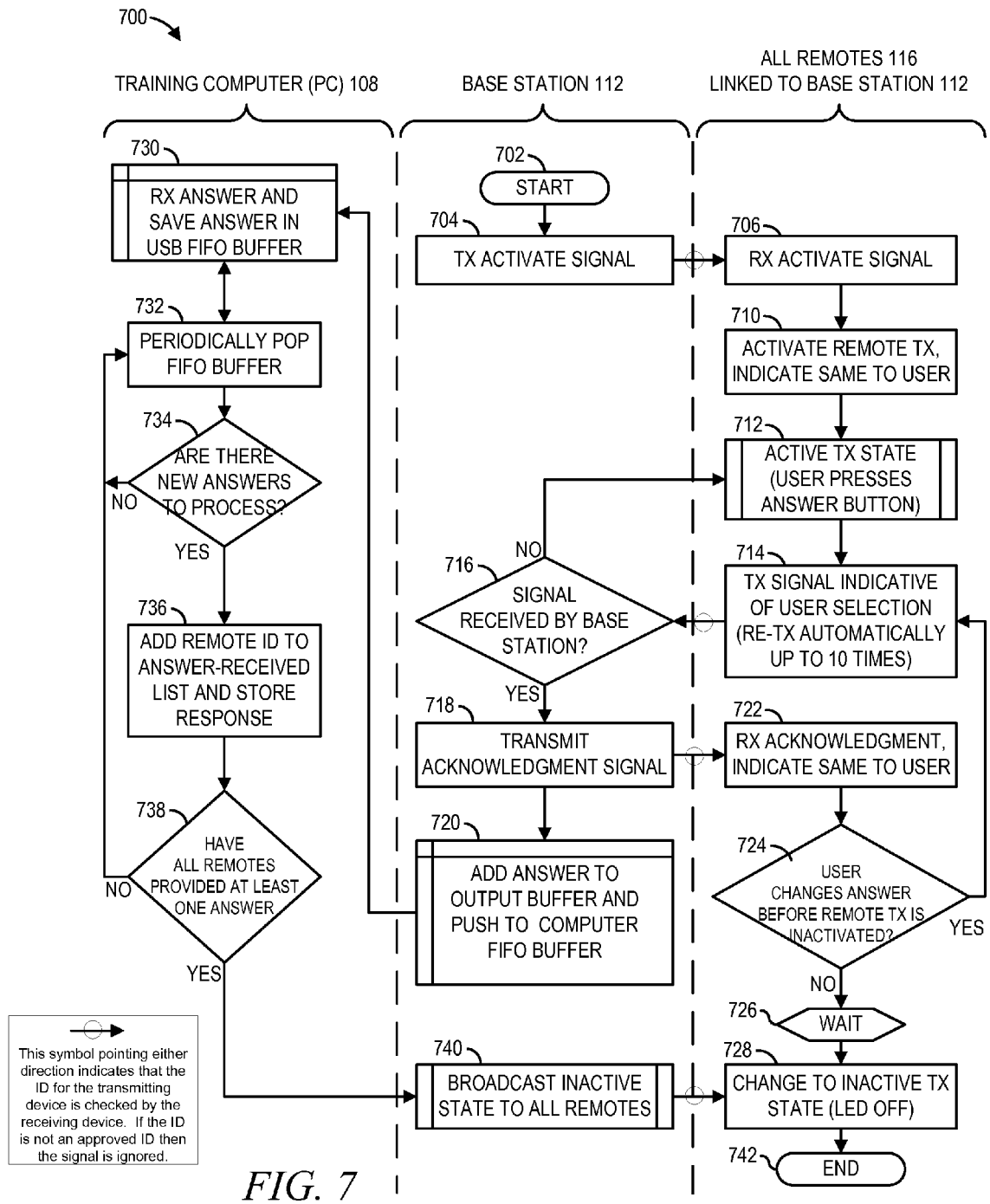
FIG. 7 is a flow chart illustrating control logic for performing in an answer mode in accordance with principles of the present invention.

FIG. 7 exemplifies a flowchart 700 of control logic implemented by the base station 112, the training computer 108, and the remote 116 for performance of the remote 116 in an answer mode in accordance with principles of the present invention. It is noted that the remote 116 is typically in an "inactive" state until it is activated by the base station 112. While the remote 116 can receive signals whether it is in an active or inactive state, it can transmit signals only when it is "active"; thus, when it is "inactive", it can receive signals from the base station, but cannot transmit signals. The process for activating the remote 116 so it can perform in an answer mode is initiated at step 702, and at step 704, the base station 112 transmits an ACTIVATE signal to the remote 116. At step 706, the remote 116 receives the ACTIVATE signal.

Note that the symbol of an arrow with a circle around it, for example between steps 704 and 706, indicates that the ID for the transmitting device is checked by the receiving device. If the ID is not an approved ID then the signal is ignored. When the base station 112 is the receiver, the remote ID is sent to the computer 108 and checked to determine if the ID is included in the Communication List. When a remote 116 is the receiver, the base station ID from the incoming message is compared with the ID stored in the remote's memory 302. In either case, if the ID is approved, then communication proceeds, but if the ID is not approved, then the incoming signal is ignored.

At step 710 the remote is activated and the state of being active is indicated to the user by, for example, illuminating a red LED (Light Emitting Diode). At step 712, the remote 116 enters into an ACTIVATE Transmit state, in which a user may interface with the remote 116 to answer a question, for example, by clicking on the remote a button corresponding to an answer to a question presented. At step 714, the remote 116 transmits a signal to the base station 112 indicative of the answer selected by the user in step 712. At step 716, the base station 112 determines whether or not it has received the answer from the remote, and if it has not, then execution returns to step 712; otherwise, if a signal is received by the base station, then execution proceeds to step 718. At step 718, an ACKNOWLEDGMENT signal is transmitted to the remote 116 and execution proceeds to steps 720 and 722.

At step 722, the remote 116 receives the ACKNOWLEDGMENT signal from the base station 112 and indicates same to the user, such as, for example, by illuminating a green LED. At step 724, the user is preferably given an opportunity to change his/her answer. If the user indicates a change in answer, and his/her remote has not been inactivated by the base station as a result of an INACTIVE STATE signal transmitted in step 740 (discussed below), then the changed answer is recognized and execution returns to step 714; otherwise, execution proceeds to step 726, in which the remote 116 enters into a waiting period until the base station transmits an INACTIVE STATE signal in step 740 (discussed below). Upon receipt of an INACTIVE STATE signal in step 740, execution proceeds to step 728, in which the remote 116 transitions from an ACTIVE STATE to an INACTIVE STATE (i.e., the remote can still receive signals but cannot transmit signals), and indicators, such as LED's, are powered off.

After transmission of the ACKNOWLEDGMENT signal by the base station 112 to the remote 116 in step 718, execution proceeds to step 720, in which the base station 112 adds the response (comprising the answer and the ID of the remote from which the answer was received) in step 716 to its output buffer and pushes it to the computer 108 USB (Universal Serial Bus) port FIFO (first in, first out) buffer. In step 730, the computer 108 receives the response received by the base station 112 in step 716, and preferably stores the response in a USB port FIFO buffer (not shown, but a part of a standard USB port). At step 732, the computer 108 periodically pops (i.e., checks or asks) the FIFO buffer to determine whether the buffer is storing a response. If a response has been stored in the buffer, then the buffer sends the response to the computer 108 and deletes it from the buffer. If more than one response has been stored in the buffer, then the oldest response is sent to the computer 108 and then deleted from the buffer. At step 734, the computer 108 determines whether or not there are any new responses to process. If there are new responses to process, then execution proceeds to step 736; otherwise, execution returns to step 732. At step 736, the answer received as part of the response is preferably associated with the ID of the remote from which it was received (and hence also the trainee associated with the remote), and the answer and remote ID are stored in a response-received list configured in the memory of the computer 108. At step 738, a determination is made whether at least one answer has been received from all remotes 116. If it is determined that all remotes have not provided at least one answer, then execution returns to step 732; otherwise, execution proceeds to step 740. At step 740, the base station 112 broadcasts to all remotes 116 a signal to enter into the INACTIVE STATE. In step 728, the remote 116 enters into the INACTIVE STATE, and at step 742, execution is terminated.

Figure 8:
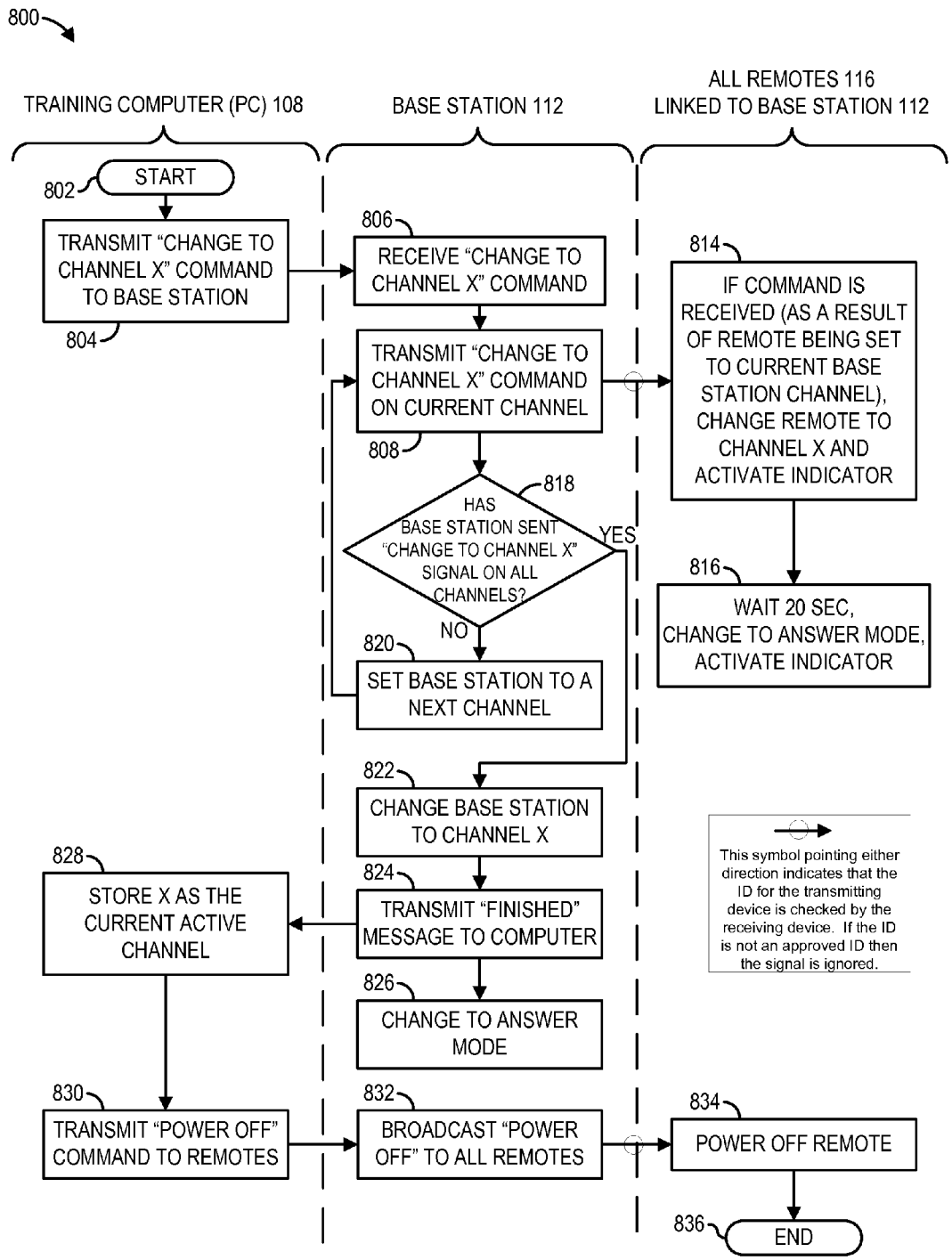
FIG. 8 is a flow chart illustrating control logic for processing a change channel in accordance with principles of the present invention.

FIG. 8 exemplifies a flowchart 800 of control logic implemented by the base station 112, the training computer 108, and the remote 116 for processing a change-channel in accordance with principles of the present invention. The change-channel process is initiated at step 802 and, at step 804, the training computer 108 transmits a CHANGE TO CHANNEL X command to the base station 112, wherein X represents the channel to which the base station 112 and remote 116 should be changed. At step 806, the base station receives the CHANGE TO CHANNEL X command and, at steps 808, 818, and 820, before changing to channel X, the base station transmits the CHANGE TO CHANNEL X command on each of the supported channel frequencies. In this way the base station is certain to transmit the command on every channel on which assigned remotes are operating. At step 814, each remote 116 that is tuned to the base station current channel receives the CHANGE TO CHANNEL X command and, if not already tuned to channel X, then the remote changes the channel on which it operates to the channel X and, preferably, an indicator, such as an LED or LCD display on the remote, illuminates or flashes to indicate that channel it is operating on has changed. Note that the base station ID is checked beforehand as indicated by the arrow with a circle around it and as described above. At step 816, the remote 116 preferably waits for a period of time, such as 20 seconds, then changes to Answer Mode, and then activates an indicator, such as an LED or LCD display, on the remote to let the trainee or supervisor know the change channel has occurred.

Returning to the completion of step 808, the base station 112 then determines in step 818 whether it (i.e., the base station) has transmitted the CHANGE TO CHANNEL X command to the remotes 116 on every channel on which it operates (although channel X can optionally be skipped), and if it has not, then at step 820, the base station channel is set to a next channel (optionally, other than channel X) and execution returns to step 808; otherwise, execution proceeds to step 822 in which the base station is changed to be operable on channel X. In step 824, having changed the channel on which the base station and all remotes operate to channel X, a "FINISHED" message is transmitted to the training computer 108 and, at step 826, the base station changes to an ANSWER mode.

At step 828, the training computer 108 receives the FINISHED message from the base station 112 and stores X as the current active channel on which the base station and remotes linked to the base station operate. At step 830, the training computer 108 transmits a POWER OFF command to the base station 112 to power off all remotes 116. At step 832, the base station 112 broadcasts a POWER OFF command to all remotes 116 linked to it, which should all be operating on channel X. At step 834, all remotes 116 linked to the base station 112 power off, and at step 836, the change-channel process terminates.

This broadcast POWER OFF signal is also used whenever the trainees or supervisor exits the SISTEM GBT software. In this way all remotes 116 are powered down when not in use, thereby greatly increasing the life of the remote's power source, preferably commercially available batteries.

Furthermore, in the preferred embodiment the remotes 116 always store the previous state (e.g., ACTIVE or INACTIVE) in non-volatile memory. That way if for whatever reason the remote loses power during training, it will restart in the same state when power is restored. This is especially useful if the power source, preferably commercially available batteries, are inadvertently removed or momentarily lose contact if, for example, a remote 116 was dropped. By storing the previous state the trainee can re-seat the batteries and continue with the training where they left off without disturbing other trainees. If the previous state is not stored, then all trainees would have to stop and wait while the remote in question is added back as an active remote.

It will be apparent to those with ordinary skill in the relevant art having the benefit of this disclosure that the present invention provides a training system that offers web-based distribution, centralized control of pedagogy consistency, and efficient and economical resource utilization via group oriented training in which a plurality of trainees can be trained without the overhead of providing each trainee with an individual PC.

Furthermore, it is understood that the present invention may take many forms and embodiments. Accordingly, several variations and embodiments may be made in the foregoing without departing from the spirit or the scope of the invention. For example, the SISTEM training system may be integrated into specific pieces of equipment. For example, a monitor and keyboard or touch screen built into an oven, meat slicer, or walk-in cooler could deliver on demand SISTEM training and maintenance tutorials tailored specifically for that particular equipment. Interactive signage on equipment or in or close to various work areas could also deliver emergency instructions.

In another embodiment of the present invention, the same concepts described above may be used in connection with the military. Armed forces face many of the same trainee problems that are faced by civilian industries, plus some unique problems such as the necessity for safe operation of weapons, possibly while under fire. All of the SISTEM training concepts, including Just-in-Time Training (JITT) and equipment-integrated training can be successfully applied to military situations.

In another embodiment of the present invention, courses may be offered in an eLearning format through the SISTEM LMS at the data center servers 104. The eLearning format is not group-based and does not involve remotes. Rather, it is a standard browser-based eLearning format. The eLearning courses, with the SISTEM LMS, are stored and served up to the Web on the data center servers.

In another embodiment of the present invention, an option is provided to operate SISTEM GBT while disconnected from the Internet. In such a case the SISTEM LMS may be installed on the training computer 108 with SISTEM GBT and training records are evaluated directly on the training computer. Alternatively, training record evaluation software (i.e., SISTEM LMS) may be integrated with the SISTEM GBT software so that end users work on the training computer 108 with only one software program.

In another embodiment of the present invention, the training computer 108 is used to train a single trainee rather than a group of trainees. In such case, the trainee can simply use a mouse or touch pad or similar device coupled directly with the training computer 108. The base station 112 and remotes 116 are then not necessary.

In another embodiment of the present invention, courses, tests, and evaluations ("items") are dynamically downloaded or streamed over the Internet to the training computer 108 in real-time when the item is played. In this way, courses, tests, and evaluations do not need to be stored on the training computer 108 prior to use. Moreover, the SISTEM GBT software may be Internet browser-based software, similar to SISTEM LMS. The only software that is required on the training computer 108 is software necessary to interface the training computer with the base station 112.

In another embodiment of the present invention, additional information is provided on the displays 304 of the remotes 116 and the display 114 of the base station 112. Such information may include training results information, including real-time or delayed feedback as to which questions were answered correctly or incorrectly, and an analysis of group results.

In another embodiment of the present invention, alternative communication technologies, such as Internet Protocol (IP), Bluetooth, and the like, are used via a network (e.g., a wireless network) rather than RF or IR as the communication mechanism between the remotes 116 and the base station 112. Furthermore, by use of such alternative communication technologies, the remotes could be cell phones that support same, or any device (e.g., an Apple iPod touch, a small notebook PC, or the like) that supports same and includes a human interface capability. In this embodiment, the base station 112 may be eliminated because the training computer 108 can provide the base station functionality.

In another embodiment of the present invention, an alternative enrollment process (FIG. 5) and/or binding process (FIG. 6) is implemented. For example, a remote 116 may be provided with a display that allows trainees to enter a sequence of numbers and send the sequence as a packet of information to the base station 112. Trainees could then bind and enroll by simply entering their employee ID or similar form of identification and sending it as a packet to the base station 112. This method would allow all students to enroll at the same time, if for example the remotes automatically re-send (or the trainees manually re-send) the enroll message to the base station until all remotes have successfully sent the enroll message.

In a further alternative enrollment and binding process, a trainee is identified and, subsequently, a remote 116 is identified, and then the remote is associated with, or assigned to, the trainee to complete the enrollment. For example, a trainee may be identified by scanning his/her employee ID badge (using e.g., barcode, magnetic strip, proximity, or the like). The remote 116 is then scanned via an ID sticker or similar component (e.g., barcode, magnetic strip, proximity, or the like). The employee is identified, then the remote is identified, and then the SISTEM GBT software assigns the remote to the employee/trainee. Multiple identification stations could operate at one time supporting the simultaneous enrollment of multiple trainees.

In another embodiment of the present invention, multiple base stations 112 are coupled to a single training computer 108. The SISTEM GBT software manages input and output data from multiple data sources, one data source for each base station 112. In this way the communication speed between the remotes and training computer 108 would increase dramatically because signals from a much larger number of remotes would be processed at approximately the same time.

In another embodiment of the present invention, the Answer Mode, discussed above with respect to FIG. 7, is implemented in an alternative manner. By way of example, the remotes are continuously active so that the trainee can send a signal to the base station at any time during training. Further, the trainee can request to know the amount of training time remaining, the number of questions remaining, how much time until the next break, or the like, and subsequently receive an answer from the base station 112. Alternatively the trainee might be able to leave the training at any time without disturbing the other trainees. Similarly trainees could enroll themselves at any time without disturbing the other trainees.

In another embodiment of the present invention, remotes may be permanently assigned to trainees and also be used as their employee identification badge or as a portion of their employee identification badge. After an initial pairing or binding with the training computer 108, the trainee would never have to go through the bind process again because the training software would store and reference the assignment between each trainee and their remote.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for providing interactive training, the system comprising:

at least one computer;

at least one display coupled to said at least one computer;

one or more base stations coupled to said at least one computer;

one or more remotes configured for wireless communication with a respective one of said one or more base stations, each of said one or more remotes being operable by a respective trainee of a group of trainees;

wherein each of said one or more remotes is defined by a respective remote ID that is unique from the remote ID of any other of said one or more remotes, and wherein the remote ID of each of said one or more remotes is stored in a computer memory of said a respective one of said at least one computer;

wherein said one or more base stations includes a respective one of one or more base station ID codes unique from the base station ID codes of all other of said one or more base stations, and said respective one of said one or more base station IDs is stored in a remote memory of each of said one or more remotes, thereby pairing each of said one or more remotes with a respective one of said one or more base stations;

wherein said at least one computer includes a computer processor coupled to said computer memory configured for storing a computer software code which, when executed by said computer processor, causes said computer processor to respond to at least one remote signal received from one of said one or more remotes, comprising steps of:

determining if said at least one remote signal includes an ID which matches an ID stored in said computer memory of one of said one or more remotes;

upon a determination that said at least one remote signal includes an ID which matches an ID stored in said computer memory of one of said one or more remotes, processing said remote signal; and upon a determination that said at least one remote signal does not include an ID which matches an ID stored in said computer memory of one of said one or more remotes, ignoring said remote signal; and wherein said at least one remote includes a remote processor coupled to said remote memory configured for storing a remote software code, which when executed by said remote processor, causes said remote processor to respond to at least one base station signal received from one of said one or more base stations, comprising steps of:

determining if said at least one base station signal includes an ID which matches an ID stored in said remote memory of a respective one of said one or more base stations;

upon a determination that said at least one base station signal includes an ID which matches an ID stored in said remote memory of a respective one of said one or more base stations, processing said at least one signal; and upon a determination that said at least one base station signal does not include an ID which matches an ID stored in said remote memory of a respective one of said one or more base stations, ignoring said at least one base station signal.

2. The system of claim 1, further comprising at least one data center server coupled via a network to said at least one computer, said at least one data center server being configured for hosting training and learning management system software, said at least one computer being configured for hosting group-based training software which cooperates said training and learning management system software.

3. The system of claim 1, wherein:
each remote remains in an inactive state wherein it is disabled from transmitting, and is activated to transmit upon receipt an activate signal transmitted from a respective one of said one or more base stations; and
each respective one of said one or more base stations is configured to transmit an activate signal to a respective one or more of said one or more remotes, said activate signal being effective for placing said respective one or more of said one or more remotes in an active state wherein said respective one or more of said one or more remotes may transmit a signal to said respective one of said one or more base stations.

4. The system of claim 1, wherein each of said one or more base station IDs and each of said one or more remote IDs is a unique machine address ID ("MAC ID").

5. The system of claim 1, wherein each of said one or more base stations is effective for transmitting a power-off signal to all respective ones of said one or more remotes to cause each of said respective one of said one or more remotes to power-off.

6. The system of claim 1, wherein each of said one or more remote IDs associated with each of said one or more remotes in the memory of said at least one computer is also associated with a respective one of one or more trainees.

7. The system of claim 1, wherein said at least one computer includes a memory, a processor, and a computer-readable medium having software code, which, when said code is loaded into said memory and run by said processor, causes said processor to perform a binding sequence comprising steps of:

establishing communication between each of said one or more remotes and each respective one of said one or more base stations;

associating at each respective one of said one or more base stations each respective one of said one or more remotes with a respective one of said one or more trainees; and including a respective one of said one or more base station IDs in communications from said one or more base stations to said respective ones of said one or more remotes.

8. The system of claim 1, wherein said at least one computer includes a memory, a processor, and a computer-readable medium having software code, which, when said code is loaded into said memory and run by said processor, causes said one or more remotes to change channel, comprising steps of:

synchronizing the operating frequency of each of said one or more remotes to the operating frequency of a respective one of said one or more base stations.

9. The system of claim 1, wherein said one or more remotes includes a processor, a memory, and software code stored in said memory and executable by said processor for causing said one or more remotes to determine a frequency on which a respective one of said one or more base stations operates, comprising steps of:

subsequent to sending by each of said one or more remotes a signal at each of one or more frequencies at which a respective one of said one or more base stations operates, awaiting a response from said respective one of said one or more base stations indicating that a signal had been received by said a respective one of said one or more remotes at a particular frequency.

10. The system of claim 1, wherein said one or more remotes includes a processor, a memory, and software code stored in said memory and executable by said processor for causing said one or more remotes to determine a frequency on which a respective one of said one or more base stations operate, comprising steps of:

subsequent to sending by each of said one or more remotes a signal at each of one or more frequencies at which said one or more base stations operate, beginning with a frequency at which a respective one of said one or more base stations used in a last successful communication, awaiting a response from said respective one of said one or more base stations indicating that a signal had been received by said remote at a particular frequency.

11. The system of claim 1, wherein the memory of each of said one or more remotes into which the ID associated with a respective one of said one or more base stations is stored is non-volatile memory, and further wherein the frequency at which a respective one of said one or more base stations operates is stored in the non-volatile memory of each of said one or more remotes.

12. The system of claim 1, wherein the last logical state at which each respective remote is operating is stored in the non-volatile memory of each of said one or more remotes.

13. The system of claim 1, wherein said at least one computer includes a memory, a processor, and a computer-readable medium having software code, which, when said code is loaded into said memory and run by said processor, causes said processor to perform steps of:

receiving by a respective one of said one or more base stations a new frequency selection at which to operate;

transmitting said new frequency selection to each of said one or more remotes for operating at said new frequency; and changing the frequency at which said respective one of said one or more base stations and each of said respective one or more remotes operates to be at said new frequency.

14. The system of claim 1, wherein said at least one display is a video display for displaying video presentations generated by said at least one computer.

15. The system of claim 1, wherein each of said one or more remotes is a handheld remote.

16. The system of claim 1, wherein each of said remote ID is stored in non-volatile memory of said at least one computer.

17. The system of claim 1, wherein a respective one of said one or more base station IDs is stored in non-volatile memory of each of said one or more remotes paired with a respective one of said one or more base stations identified by said respective one of said one or more base station IDs.

18. The system of claim 1, wherein said remote is deactivated from transmitting signals upon completion of transmission of said signal from said remote.

19. The system of claim 1, wherein said remote is deactivated from transmitting signals upon receipt of an inactive state signal received from a respective one of said one or more base stations.

20. The system of claim 1, wherein each remote is defined by a "friendly" ID and said computer includes a memory, a processor, and a computer-readable medium having software code, which, when said code is loaded into said memory and run by said processor, causes said processor to perform steps of:

determining which remotes have not answered a question;
determining the "friendly" ID of said remotes that have not answered a question;
displaying a list of said "friendly" ID's of said remotes that have not answered a question; and
automatically updating said list as remotes submit answers.

21. The system of claim 1, wherein each remote is defined by a "friendly" ID and said computer includes a memory, a processor, and a computer-readable medium having software code, which, when said code is loaded into said memory and run by said processor, causes said processor to perform steps of:

determining which remotes have not answered a question;
determining the "friendly" ID of said remotes that have not answered a question;
associating a name of a trainee with each "friendly" ID;
displaying a list of said "friendly" ID's and associated names of trainees assigned to said remotes that have not answered a question; and
automatically updating said list as remotes submit answers.

22. The system of claim 1, wherein said memory of said at least one computer comprises a computer-readable medium and said memory of said at least one remote comprises non-volatile memory and said remote ID of each of said one or more remotes is stored in said computer-readable medium of said at least one computer, and said respective base station ID is stored in said non-volatile memory of each of said one or more remotes so that no future pairing between said one or more remotes, said one or more base stations, and said at least one computer is necessary.

23. The system of claim 1, wherein each of said one or more remotes is assigned in an assignment to a respective trainee of one or more trainees, said memory of said at least one computer comprises a computer-readable medium and said memory of said at least one remote comprises non-volatile memory, and said remote ID of each of said one or more remotes and said assignment is stored in said computer-readable medium of said at least one computer, and said respective base station ID is stored in said non-volatile memory of each of said one or more remotes so that no future pairing between said one or more remotes, a respective one of said one or more base stations, and said at least one computer is necessary, and no future assignment between one or more trainees and one or more remotes is necessary, provided that each of said one or more trainees retains his or her own unique remote.

* * * * *